United States Patent [19]

Horton et al.

[11] Patent Number: 5,419,820

[45] Date of Patent: May 30, 1995

[54] PROCESS FOR PRODUCING ENRICHED URANIUM HAVING A $^{235}$U CONTENT OF AT LEAST 4 WT. % VIA COMBINATION OF A GASEOUS DIFFUSION PROCESS AND AN ATOMIC VAPOR LASER ISOTOPE SEPARATION PROCESS TO ELIMINATE URANIUM HEXAFLUORIDE TAILS STORAGE

[75] Inventors: James A. Horton, Livermore, Calif.; Howard W. Hayden, Jr., Oakridge, Tenn.

[73] Assignee: The United States of America as represented by the United States Department of Energy, Washington, D.C.

[21] Appl. No.: 70,741

[22] Filed: Jun. 2, 1993

[51] Int. Cl.$^6$ .............................................. B01D 5/00
[52] U.S. Cl. ........................... 204/157.22; 204/157.2; 204/157.21; 423/DIG. 7
[58] Field of Search ...................... 204/157.2, 157.22; 423/DIG. 7, 258; 75/399; 55/34, 48

[56] References Cited

U.S. PATENT DOCUMENTS

| | | | |
|---|---|---|---|
| 3,626,665 | 12/1971 | Fenn et al. | 204/157.2 |
| 3,959,649 | 5/1976 | Forsen | 250/299 |
| 4,225,324 | 9/1980 | Gazda | 55/17 |
| 4,280,984 | 7/1981 | Miyake et al. | 423/6 |
| 4,372,928 | 2/1983 | Chatelet et al. | 423/249 |
| 4,427,424 | 1/1984 | Charpin et al. | 55/158 |
| 4,786,478 | 11/1988 | Ahmed et al. | 422/186.03 |

OTHER PUBLICATIONS

C&E News, "U.S. opts for laser enrichment of uranium," Oct. 1985.

Paisner, J. A., "Atomic Vapor Laser Isotope Separation" *Applied Physics B*, vol. 46, 1988, pp. 253-260.

Benedict, Manson, et al., *Nuclear Chemical Engineering*, 2nd ed., New York: McGraw-Hill Book Company, 1981, pp. 148, 635, 812-813, 817, and 914-919.

*Primary Examiner*—Donald P. Walsh
*Assistant Examiner*—Ngoclan T. Mai
*Attorney, Agent, or Firm*—Miguel A. Valdes; Roger S. Gaither; William R. Moser

[57] ABSTRACT

An uranium enrichment process capable of producing an enriched uranium, having a $^{235}$U content greater than about 4 wt. %, is disclosed which will consume less energy and produce metallic uranium tails having a lower $^{235}$U content than the tails normally produced in a gaseous diffusion separation process and, therefore, eliminate UF$_6$ tails storage and sharply reduce fluorine use. The uranium enrichment process comprises feeding metallic uranium into an atomic vapor laser isotope separation process to produce an enriched metallic uranium isotopic mixture having a $^{235}$U content of at least about 2 wt. % and a metallic uranium residue containing from about 0.1 wt. % to about 0.2 wt. % $^{235}$U; fluorinating this enriched metallic uranium isotopic mixture to form UF$_6$; processing the resultant isotopic mixture of UF$_6$ in a gaseous diffusion process to produce a final enriched uranium product having a $^{235}$U content of at least 4 wt. %, and up to 93.5 wt. % or higher, of the total uranium content of the product, and a low $^{235}$U content UF$_6$ having a $^{235}$U content of about 0.71 wt. % of the total uranium content of the low $^{235}$U content UF$_6$; and converting this low $^{235}$U content UF$_6$ to metallic uranium for recycle to the atomic vapor laser isotope separation process.

10 Claims, 3 Drawing Sheets

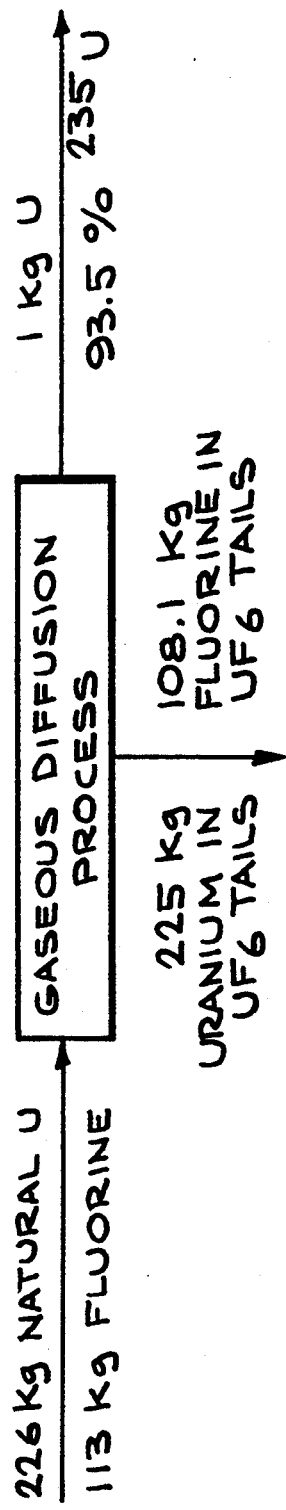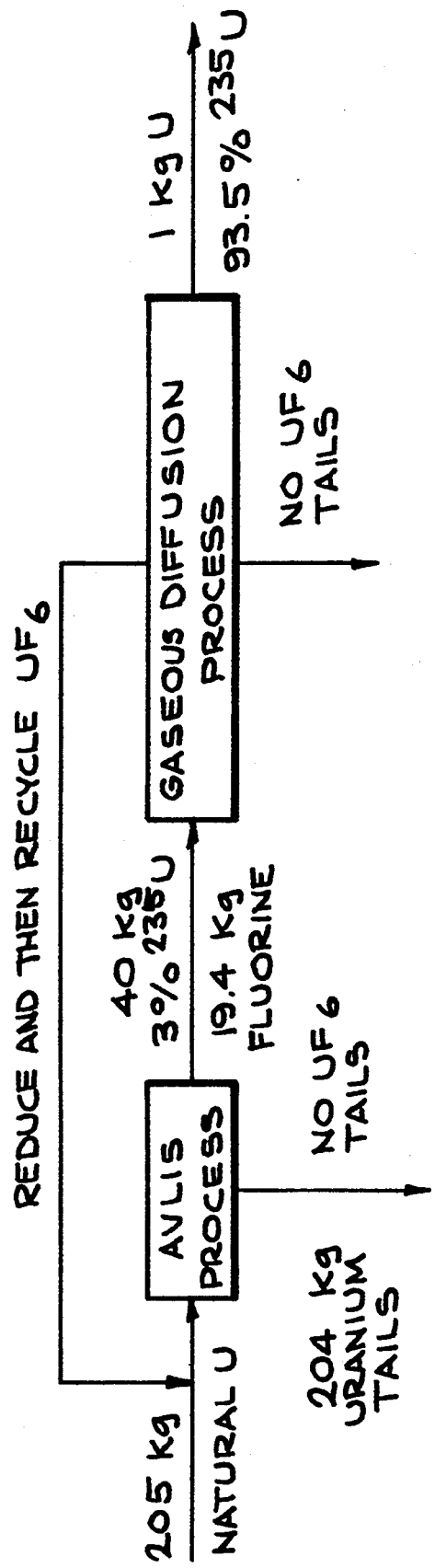

PROCESS FOR PRODUCING ENRICHED URANIUM HAVING A $^{235}$U CONTENT OF AT LEAST 4 WT. % VIA COMBINATION OF A GASEOUS DIFFUSION PROCESS AND AN ATOMIC VAPOR LASER ISOTOPE SEPARATION PROCESS TO ELIMINATE URANIUM HEXAFLUORIDE TAILS STORAGE

The invention described herein arose in the course of, or under, Contract No. W-7405-ENG-48 between the United States Department of Energy and the University of California for the operation of Lawrence Livermore National Laboratory; and in the course of, or under Contract No. DE-AC05-84OR21400 between the United States Department of Energy and Martin Marietta Energy Systems, Inc. for the operation of Oak Ridge National Laboratory.

BACKGROUND OF THE INVENTION

This invention relates to the processing of uranium. More particularly, this invention relates to a process for producing enriched uranium in the form of $UF_6$, with low assay metallic tails, using a combination of a gaseous diffusion process (or a gas centrifuge process) and an atomic vapor laser isotope separation process.

Enriched uranium, i.e., uranium having a $^{235}$U content higher than the naturally occurring 0.7 wt. %, has been produced for many years using the well known gaseous diffusion process in which $^{235}$U/$^{238}$U isotopes, in the form of $UF_6$, are separated from one another by passing the $UF_6$ vapors through multiple porous membrane filter stages in which the transmitted fraction, which is fed into the primary side of the next stage, is richer in $^{235}$U than the retained fraction, which is fed back to the primary side of the preceding stage. While this process can produce a $^{235}$U/$^{238}$U isotopic mixture of almost any ratio (by providing a sufficient number of membrane stages), the process is very energy intensive and produces UF6 tails which present an ever growing storage and disposal problem.

More recently a newer process has been developed for uranium enrichment, using metallic uranium instead of $UF_6$ gas as the feed material. This process, known as Atomic Vapor Laser Isotope Separation (AVLIS), is described by Benedict, Pigford, and Levi, in a book entitled "Nuclear Chemical Engineering", published in 1981 by McGraw-Hill Book Company (New York), where uranium isotope separation is described in general at pages 812, 813, and 817, and laser isotope separation of uranium metal vapor (the AVLIS process) is specifically discussed and described on pages 914–919. This Atomic Vapor Laser Isotope Separation process is also described by J. A. Paisner in an article entitled "Atomic Vapor Laser Isotope Separation", published in Applied Physics B, Volume 46, at pages 253–260 (1988), the disclosure of which is hereby incorporated by reference herein.

Briefly, the process consists of vaporizing an isotopic mixture of $^{235}$U/$^{238}$U in metallic form, and then selectively ionizing the $^{235}$U isotope using a laser energy source such as a copper laser. The ionized $^{235}$U is collected on a negatively biased electrode as the desired product stream, while the non-ionized $^{238}$U vapors pass out of the extractor as the tails stream. This process uses substantially less energy than the traditional gaseous diffusion separation process and produces a lower $^{235}$U content tail in metallic form which is preferable to the $UF_6$ tail conventionally produced in the gaseous diffusion separation process from a storage and disposal standpoint.

It would, therefore, appear to be desirable to perform all uranium enrichment by the atomic vapor laser isotope separation process. From a standpoint of process economics, however, the atomic vapor laser isotope separation process is most desirably applied for enrichment levels in the order of 2–5 wt. %, and typically about 2–3 wt. %. There are certain applications, however, where a higher $^{235}$U content would be desirable, such as, for example, light water reactors needing uranium with assays of 4 to 5 wt. % $^{235}$U, research reactors, naval reactors, and high temperature gas cooled reactors needing a 93.5 wt. % $^{235}$U as described by Benedict, Pigford, and Levi, on page 148 in "Nuclear Chemical Engineering". Conventionally such needs for such higher $^{235}$U content have necessitated the use of the gaseous diffusion separation process.

It would, however, be desirable if one could somehow produce an enriched uranium having at least 4 wt % $^{235}$U, such as is available with the gaseous diffusion separation process, while still enjoying the benefits of lower energy consumption and production of lower $^{235}$U assay uranium tails in metallic form which characterize the atomic vapor laser isotope separation process.

SUMMARY OF THE INVENTION

It is, therefore, an object of the invention to provide a uranium enrichment process capable of producing an enriched uranium, having a $^{235}$U content of at least about 4 wt. %, which will consume less energy and produce metallic uranium tails having a lower $^{235}$U content than the more massive fluoride tails normally produced in a gaseous diffusion separation process.

The uranium enrichment process of the invention comprises: feeding metallic uranium into an atomic vapor laser isotope separation process to produce an enriched metallic uranium isotopic mixture having a $^{235}$U content of at least about 2 wt. % and a metallic uranium residue containing from about 0.1 wt. % to about 0.2 wt. % $^{235}$U; fluorinating this enriched metallic uranium isotopic mixture to form $UF_6$ processing the resultant isotopic mixture of $UF_6$ in a gaseous diffusion process to produce a final enriched uranium product having a $^{235}$U content of at least 4 wt. %, and up to 93.5 wt. % or higher, of the total uranium content of the product, and a low $^{235}$U content $UF_6$ having a $^{235}$U content of about 0.7 wt. % of the total uranium content of the low $^{235}$U content UF6; and converting this low $^{235}$U content $UF_6$ to metallic uranium for recycle to the atomic vapor laser isotope separation process.

The result is an enriched uranium product of at least 4 wt. % $^{235}$U (from the gaseous diffusion process), a low $^{235}$U assay metallic uranium residue (from the atomic vapor laser isotope separation process), referred to as "tails" in the industry, and no fluorine-containing uranium mils.

BRIEF DESCRIPTION OF THE DRAWINGS

FIG. 1 is a pictorial diagram of a prior art gaseous diffusion process as used to produce an enriched uranium containing 93.5 wt. % $^{235}$U, showing the various material inputs and outputs.

FIG. 2 is a comparison pictorial diagram showing, in abbreviated form, the process of the invention and showing, in comparison to FIG. 1, the various material inputs and outputs for the process of the invention to produce the same 93.5 wt. % enriched uranium.

DETAILED DESCRIPTION OF THE INVENTION

Figure 3:
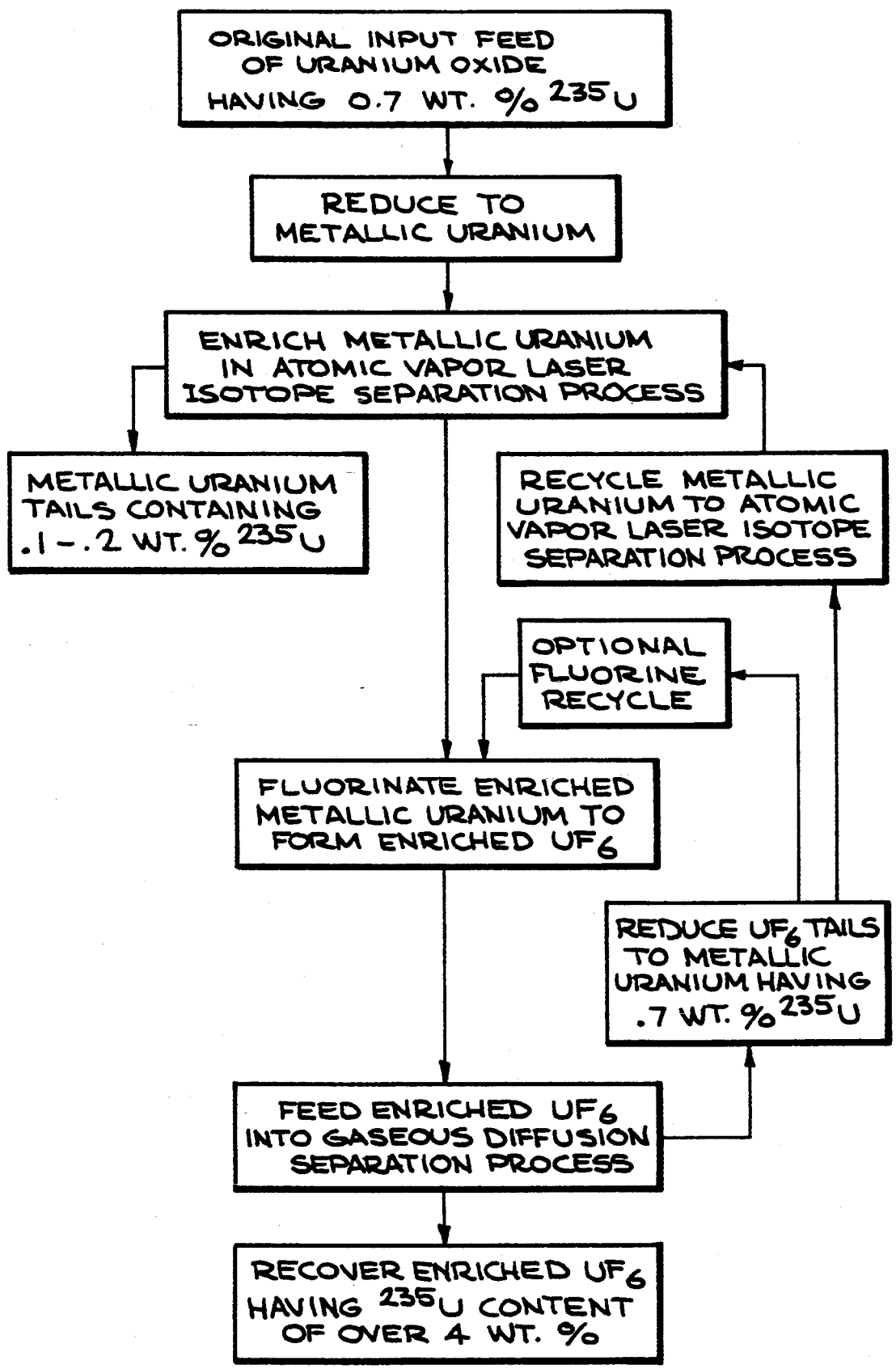
FIG. 3 is an expanded pictorial diagram showing the process of the invention which more graphically illustrates the recycling and reduction of the residues from the gaseous diffusion process back to the atomic vapor laser isotope separation process, as well as showing a flow of uranium oxide start up material, i.e., nonrecycled material, into the process stream.

The process of the invention comprises the use of the enriched metallic uranium product from an atomic vapor laser isotope separation process as feed material for a gaseous diffusion process and the tails from the gaseous diffusion process as recycled starting material for the atomic vapor laser isotope separation process. The resulting products are: 1) a high $^{235}U$ content enriched uranium product from the gaseous diffusion process, i.e., at least about 4 wt. % $^{235}U$; and 2) a low $^{235}U$ content metallic uranium residue, i.e., 0.2 wt. % or less $^{235}U$, from the atomic vapor laser isotope separation process. No fluoride-containing uranium residues or tails are produced by the process, and the total amount of fluoride used in the process is markedly reduced from the amount which would be required if the entire enrichment were to be carried out in a gaseous diffusion process.

The wt. % of the $^{235}U$, as referred to herein, is intended to mean the wt. % of $^{235}U$ based on the total weight of uranium isotopes present, not the wt. % of $^{235}U$, for example, in a $UF_6$ gas.

While the process of the invention has already been described with respect to the use of a combination of the gaseous diffusion process (GDP) and the atomic vapor laser isotope separation process (AVLIS), it will be understood that a gas centrifuge process (GCP) could be used instead of the GDP process in the process of the invention, and statements herein concerning the advantages of the process of the invention over the sole use of the gaseous diffusion process generally apply similarly to the gas centrifuge process. However, for purposes of illustration, and not by way of limitation, the process of the invention will be hereinafter described using a gaseous diffusion process.

With respect to the amounts of fluorine used in the process of the invention, in comparison to the sole use of the gaseous diffusion process, attention is directed to FIGS. 1 and 2, which respectively show the amounts of both natural uranium and fluorine which would be needed to produce 1 kilogram of 93.5% enriched uranium, i.e. 93.5 wt. % $^{235}U$ using, the prior art gaseous diffusion process (FIG. 1) and the process of the invention (FIG. 2). It will be noted that over 10% more natural uranium (uranium as found in nature containing ~0.7 wt. % $^{235}U$) is needed in the prior art process; and 112 kilograms of fluorine in the prior art process, as opposed to only 20 kilograms of fluorine in the process of the invention, an over fivefold difference.

The use of the term fluorine, as used herein, is intended to include fluorine from a liquid or vapor source such as, for example, HF; as well as in gaseous form such as, for example $F_2$.

It should be noted, in this regard, that the comparison of the fluorine consumption between the prior art process of FIG. 1 and the process of the invention in FIG. 2 does not even take into account the possible recycling of the fluorine values from the step of reducing the $UF_6$ being recycled from the gaseous diffusion step back to the atomic vapor laser isotope separation step, as will be discussed below.

However, perhaps the most important difference shown in FIGS. 1 and 2 is the fact that the process of the invention produces no fluorine-containing uranium residues ($UF_6$ tails) in contrast to the prior art process. It will be noted from the drawing that the prior art process produces tails containing 225 kilograms of uranium and 112 kilograms of fluorine, while the process of the invention produces tails containing only 204 kilograms of uranium, and no fluorine! Furthermore, the tails produced by the process of the invention are a high density (20 grams/cm$^3$) metal product requiring no specialized containers for storage to prevent exposure to air, while the prior art process produces low density (6 grams/cm$^3$) fluorine-containing tails which require special storage containers which are subject to corrosion. This need for special containers for fluorine-containing mils is to prevent either leakage or exposure of the fluorine-containing tails to moisture in the air which could result in production of highly poisonous HF.

It should also be noted that while the invention is described with respect to the enrichment of the $^{235}U$ content of a $^{235}U/^{238}U$ mixture, the process may be used for enrichment processes for other isotopes of uranium as well.

Figure 4:
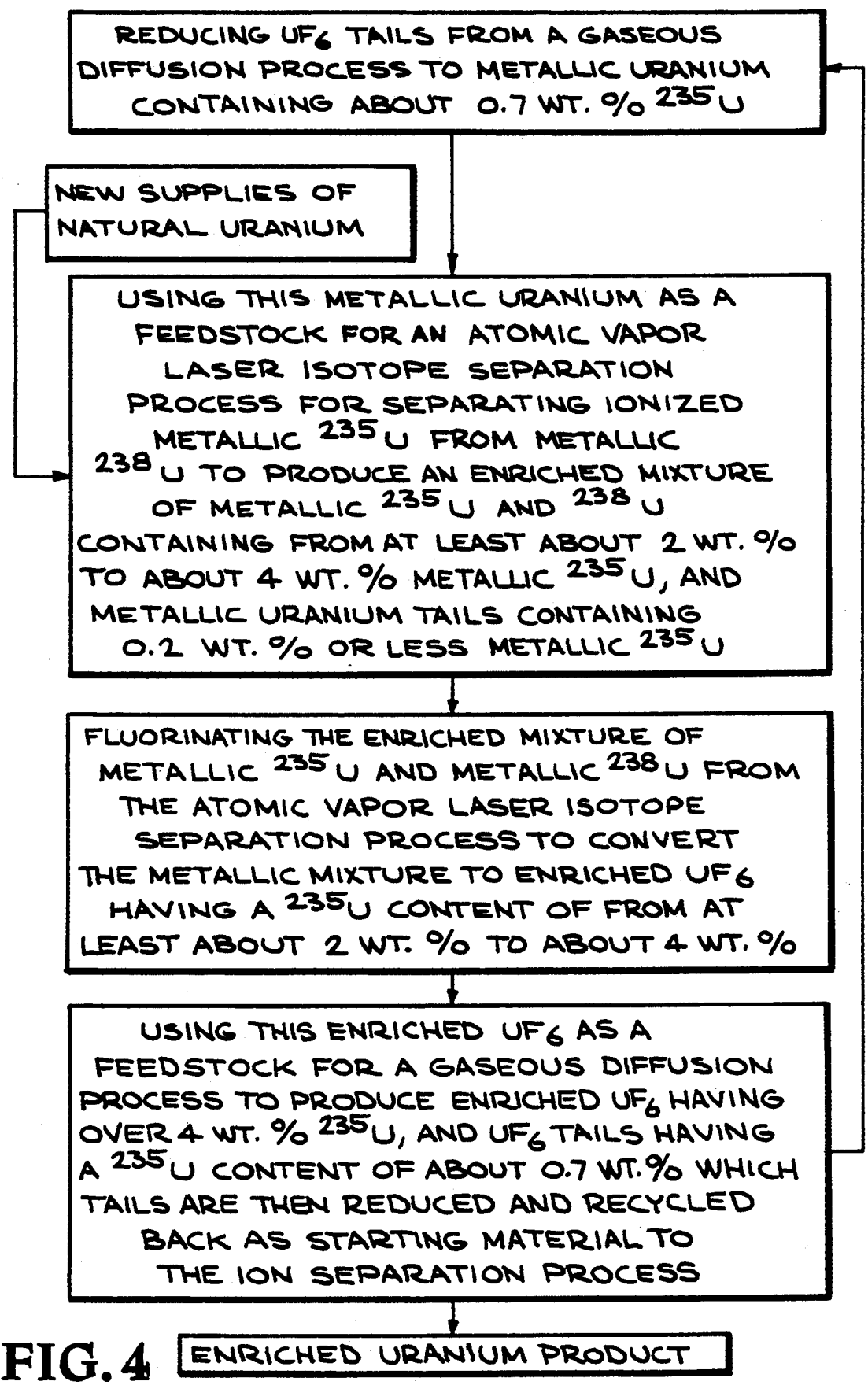
FIG. 4 is a flowsheet which illustrates the process of the invention.

Turning now to FIGS. 3 and 4, $UF_6$ from the gaseous diffusion process, having a $^{235}U$ content ranging from about 0.6 wt. % to about 0.8 wt. %, and usually containing about 0.7 wt. % $^{235}U$, is reduced to metallic uranium, and this metallic uranium (also containing from about 0.6 wt. % to about 0.8 wt. % $^{235}U$, and usually about 0.7 wt. % $^{235}U$) is then used as all or part of the feed stream into the atomic vapor laser isotope separation process. The enriched metallic uranium product from the atomic vapor laser isotope separation process, which will contain at least 2 wt. % $^{235}U$, and preferably at least about 3 wt. % $^{235}U$, is then fluorinated to provide a high $^{235}U$ content $UF_6$ feed stock for the gaseous diffusion process. It will be understood that the higher $^{235}U$ content metallic uranium product from the atomic vapor laser isotope separation process is preferred because the overall energy balance of the atomic vapor laser isotope separation process is better than that of the gaseous diffusion separation process, as well as the need to use less fluoride in the overall process, as previously described.

The metallic uranium tails or residues from the atomic vapor laser isotope separation process, having a low $^{235}U$ content of 0.2 wt. % or less, are then the only by-product of the combined process and, as discussed above, such residues are preferable to the normal $UF_6$ tails from the gaseous diffusion process, both because of their lower $^{235}U$ content (the $^{235}U$ content of the $UF_6$ tails from a gaseous diffusion process is usually about 0.3 wt. % $^{235}U$), and the residue is in a compact metallic form, rather than a more massive fluorinated form that also requires a high quality pressure vessel for semi-permanent waste storage.

The isotopic uranium mixture in metallic form, used as a feed stream for the atomic vapor laser isotope separation (AVLIS) apparatus is, in accordance with the invention, usually composed of a mixture of new metal with recycle metal produced by reducing the $UF_6$ from the gaseous diffusion process. In the atomic vapor laser isotope separation process, the metallic uranium is vaporized, exposed to laser radiation to selectively ionize the $^{235}U$ isotopes, and then separated into a $^{235}U$-rich fraction or product collected from a negatively biased electrode, and a $^{235}U$ depleted fraction which is collected as non-ionized vapors.

Thus, it is more economical to pre-enrich the uranium via the atomic vapor laser isotope separation process than the gaseous diffusion process. The basic reason for even using the gaseous diffusion process is to achieve a $^{235}U$ content higher than that easily attainable when only the atomic vapor laser isotope separation process is used. Therefore, the higher the $^{235}U$ content of the product from the atomic vapor laser isotope separation process, the less the number of filter stages or cycles of the $UF_6$ feed through the gaseous diffusion process to achieve the desired $^{235}U$ content. Furthermore, additional energy and facilities savings in the gaseous diffusion process are achieved through extracting "tails" material with an assay of 0.71 wt. % $^{235}U$, rather than the typical practice of about 0.3 wt. % $^{235}U$.

The residue or tails from the atomic vapor laser isotope diffusion process will comprise metallic uranium, having a $^{235}U$ content of 0.2 wt % or less, usually from about 0.1 to about 0.2 wt. % $^{235}U$. Such residues may then be stored or disposed of in a more environmentally acceptable form than the normal $UF_6$ tails from the gaseous diffusion process.

After the enriched metallic uranium product from the atomic vapor laser isotope separation process has been recovered, it is converted to $UF_6$ in preparation for its use as a feed stock for the gaseous diffusion process. This enriched metallic uranium product may be converted to $UF_6$ using much the same technology as is normally used for the conversion of uranium oxide to $UF_6$, e.g., by exposure of the metallic uranium to fluorine gas or HF vapors.

resulting $UF_6$ product, having a $^{235}U$ content of at least about 2 wt. %, and preferably at least about 3 wt. %, is then fed into the gaseous diffusion process where, as previously described, the $UF_6$ vapors are then passed through a series or cascade of porous membrane filters, with the filtrate or transmitted fraction, passing through the membrane filter, being passed to the next membrane filter stage, while the retained fraction is fed back to the preceding membrane filter stage.

The $UF_6$ is passed through a sufficient number of stages in the gaseous diffusion process as is necessary to attain the desired $^{235}U$ content, which may range from a minimum of about 4 wt. % up to as high as is needed. Typically, as previously discussed, this may be about 5 wt. % for applications such as light water reactors, but may be as high as 93.5 wt. % for applications such as, for example, high temperature gas cooled reactors, as previously mentioned.

The resultant $^{235}U$-enriched $UF_6$ product is then collected for its intended use and the resulting low $^{235}U$ content $UF_6$, usually having a $^{235}U$ content ranging from about 0.6 wt. % to about 0.8 wt. %, typically about 0.7 wt. %, is recovered.

This low $^{235}U$ content $UF_6$ may then be reduced to metallic uranium and used as a feed stock for the atomic vapor laser isotope separation process, either as the sole source, or blended with the reduced uranium oxide ore as previously described, using, for example, the well known Ames reduction process, in accordance with a preferred mode of operation of the process of the invention, and as shown in FIG. 3.

Alternatively, if desired, the low $^{235}U$ content $UF_6$ which contains, as previously mentioned, about 0.6 wt. % to about 0.8 wt. % $^{235}U$ content, may be sold, for example, on the open market as starting material for conventional gaseous diffusion processes, which are still in commercial operation. However, it will be understood that the process of the invention is most effective from a standpoint of fluorine conservation (both economically and environmentally) when such low $^{235}U$ content $UF_6$ is recycled back to the atomic vapor laser isotope separation process.

When the low $^{235}U$ content $UF_6$ from the gaseous diffusion step is recycled back to the atomic vapor laser isotope separation step, in accordance with the preferred embodiment of the invention, the $UF_6$ is reduced to form metallic uranium to be used as feed for the atomic vapor laser isotope separation step. As shown in FIG. 2, new or makeup fluorine may then be used to convert the partially enriched metallic uranium product of the atomic vapor laser isotope separation step or process into $UF_6$ for introduction as feed into the gaseous diffusion step.

However, as shown in FIG. 3, for optimum use of the fluorine in the process, the fluorine values from the $UF_6$ reduction step may be recovered and used in the fluorination step, thus eliminating or severely reducing the need for new fluorine introduction into the fluorination step. Procedures to reduced the recycled low $^{235}U$ content $UF_6$ and recover the fluorine values are well known to those skilled in the art. These include, for example, contacting the $UF_6$ with hot hydrogen to reduce the $UF_6$ to $UF_4$ and HF, and the subsequent use of metallic magnesium to then reduce the $UF_4$ to metallic uranium. The resulting magnesium fluoride can then be processed to recover all or part of the magnesium and fluorine values. The recovered fluorine values can then be recycled as fluorine sources in the fluorination step.

The following table shows the amount of uranium feed and fluorine needed to produce one kilogram of uranium of varying $^{235}U$ wt. % enrichments as indicated, using either prior art processes or the process of the invention. The amounts of $^{235}U$ and fluorine (if any) in the tails is also shown for each case. In the first instance, the materials used and produced in the conventional gaseous diffusion process (GDP) are shown for a 3 wt. % $^{235}U$ enrichment. In the second instance, the materials used and produced are shown to obtain the same 3 wt. % $^{235}U$ product using the atomic vapor laser isotope separation process (AVLIS). The third run shows the materials used and produced when a 5 wt. % $^{235}U$ enrichment is obtained solely by the gaseous diffusion process. This is in contrast to the use of the process of the invention, which is shown in run four, to produce the same 5 wt. % $^{235}U$ enrichment. Similarly, runs five and six of the table compare obtaining a 93.5 wt. % $^{235}U$ enrichment using, respectively, only GDP and using the process of the invention.

It will be noted that the low amount of fluorine shown in the feed in runs four and six (representing the process of the invention) is based on the assumption that all of the fluorine from the reduction of the recycled low $^{235}U$ content $UF_6$ from the gaseous diffusion process will be used in the fluorination of the enriched metallic uranium from the atomic vapor laser isotope separation process, so that the only fluorine used will be the 0.5 kilograms of fluorine in the 1 kilogram of final enriched UF$_6$ product of the gaseous diffusion step.

If on the other hand, the fluorine values liberated by the reduction of the UF$_6$ are not recovered, the fluorine content of the feed, in runs four and six (the process of the invention), will be higher. In the 5 wt. % $^{235}$U enrichment (run four), the initial fluorine feed will be 0.9 kilograms, and for the 93.5 wt. % $^{235}$U enrichment (run six), the initial fluorine feed will be 19.4 kilograms. However, as previously discussed with respect to FIG. 2, even when the fluorine values from the low $^{235}$U content UF$_6$ reduction step are not recovered and recycled, the total fluorine used in the process of the invention is still far less then when only the gaseous diffusion process is used to produce the same enrichment. More importantly, however, whether such fluorine values are recovered or not, the table shows that no uranium fluoride residues are produced by the process of the invention.

| | FORMATION OF 1 KILOGRAM OF ENRICHED URANIUM FROM 0.711 WT. % $^{235}$URANIUM FEED | | | | | | |
|---|---|---|---|---|---|---|---|
| | | FEED | | TAILS | | | PRODUCT |
| RUN NO. | PROCESS TYPE | U (kg) | F (kg) | $^{235}$U (wt. %) | U (kg) | F (kg) | $^{235}$U (wt. %) |
| 1 | GDP | 6.6 | 3.1 | 0.3 | 5.6 | 2.6 | 3 |
| 2 | AVLIS | 5.1 | 0 | 0.15 | 4.1 | 0 | 3 |
| 3 | GDP | 11.4 | 5.5 | 0.3 | 10.4 | 5.0 | 5 |
| 4 | INV | 9.5 | 0.5 | 0.15 | 8.5 | 0 | 5 |
| 5 | GDP | 226.8 | 108.6 | 0.3 | 255.8 | 108.1 | 93.5 |
| 6 | INV | 205.9 | 0.5 | 0.15 | 204.9 | 0 | 93.5 |

Thus, the invention provides an economical process for the production of enriched $^{235}$U fuel having a $^{235}$U content higher that the 3 wt. % maximum $^{235}$U content usually achievable with the atomic vapor laser isotope separation process, without however, using the less economical gaseous diffusion process for the entire enrichment process, and without producing UF$_6$ tails or residues which must be stored or in other ways disposed of, which usually presents environmental problems. Instead, the use of partially enriched metallic uranium as a feed for the gaseous diffusion process (from the atomic vapor laser isotope separation process) results in a residue from the gaseous diffusion process having a high enough $^{235}$U content to permit utilization of such UF$_6$ residue as feed stock, either for commercial gaseous diffusion processes, or for the atomic vapor laser isotope separation process (after reduction of the UF$_6$ to metallic uranium), resulting in complete elimination of environmentally unacceptable UF$_6$ tails from the process.

While a specific embodiment of the process for producing enriched uranium has been illustrated and described for carrying out the process in accordance with this invention, modifications and changes of the apparatus, parameters, materials, etc. will become apparent to those skilled in the art, and it is intended to cover in the appended claims all such modifications and changes which come within the scope of the invention.

What is claimed is:

1. A uranium enrichment process capable of producing enriched uranium having a $^{235}$U content of at least 4 wt. % which comprises:
   a) fluorinating a partially enriched isotopic mixture of metallic $^{235}$U/$^{238}$U from an atomic vapor laser isotope separation process, having a $^{235}$U content of at least about 2 wt. %, to form an isotopic mixture of UF$_6$;
   b) feeding the resultant isotopic mixture of UF$_6$ into a gaseous diffusion process; and
   c) processing said UF$_6$ in said gaseous diffusion process until the desired $^{235}$U content has been achieved.

2. The process of claim 1 including the further step of recycling low $^{235}$U content UF$_6$ from said gaseous diffusion process back to said atomic vapor laser isotope separation process.

3. The process of claim 2 wherein said step of recycling said low $^{235}$U content UF$_6$ back to said atomic vapor laser isotope separation process further includes the step of reducing said recycled UF$_6$ to metallic uranium and then introducing said metallic uranium into said atomic vapor laser isotope separation process as feed material.

4. The process of claim 3 including the further steps of recovering fluorine values from said low $^{235}$U content UF$_6$ reduction step and recycling said recovered fluorine values to said fluorination step.

5. The process of claim 2 wherein said recycled low $^{235}$U content UF$_6$ has a $^{235}$U content within the range of from about 0.6 wt %. to about 0.8 wt. %, based on the total weight of uranium in said UF$_6$.

6. A uranium enrichment process which comprises:
   a) feeding metallic uranium into an atomic vapor laser isotope separation process to produce a partially enriched metallic uranium isotopic mixture having a $^{235}$U content of at least about 2 wt. % and a metallic uranium residue containing from about 0.1 wt. % to about 0.2 wt. % $^{235}$U;
   b) fluorinating said partially enriched metallic uranium isotopic mixture to form an isotopic mixture of UF$_6$;
   c) processing said resultant isotopic mixture of UF$_6$ in a gaseous diffusion process to produce a final enriched uranium product having a $^{235}$U content of at least 4 wt. % of the total uranium content of said finally enriched uranium product, and a low $^{235}$U content UF$_6$ having a $^{235}$U content of about 0.71 wt. % of the total uranium content of said low $^{235}$U content UF$_6$ and
   d) converting said low $^{235}$U content UF$_6$ to metallic uranium for recycle to said atomic vapor laser isotope separation process.

7. The process of claim 6 wherein said final enriched uranium product has a $^{235}$U content of at least 93.5 wt. % of the total uranium content of said finally enriched uranium product.

8. A uranium enrichment process characterized by the absence of UF$_6$ tails which comprises:
   a) feeding metallic uranium into an atomic vapor laser isotope separation process;

b) recovering a partially enriched metallic uranium isotopic mixture of $^{235}U/^{238}U$ from said atomic vapor laser isotope separation process, having a $^{235}U$ content of at least about 2 wt. %, based on the total weight of uranium in said isotopic mixture;

c) fluorinating said partially enriched isotopic mixture of metallic $^{235}U/^{238}U$ from said atomic vapor laser isotope separation process to form an isotopic mixture of $UF_6$;

d) feeding said resultant isotopic mixture of $UF_6$ into a gaseous diffusion process;

e) passing said isotopic mixture of $UF_6$ through said gaseous diffusion process until the desired $^{235}U/^{238}U$ ratio has been achieved;

f) recovering a fully enriched $UF_6$ product;

g) recovering a low $^{235}U$ content $UF_6$ from said gaseous diffusion step, having a $^{235}U$ content ranging from about 0.6 wt %. to about 0.8 wt. %; and h) reducing said low $^{235}U$ content $UF_6$ to metallic uranium for use as a feed to said atomic vapor laser isotope separation process.

9. The process of claim 8 including the further steps of recovering fluorine values from said low $^{235}U$ content $UF_6$ reduction step and recycling said recovered fluorine values to said fluorination step.

10. A uranium enrichment process which comprises:

a) feeding metallic uranium into an atomic vapor laser isotope separation process;

b) recovering a partially enriched metallic uranium isotopic mixture of $^{235}U/^{238}U$ from said atomic vapor laser isotope separation process having a $^{235}U$ content of at least about 2 wt. %, based on the total weight of uranium in said isotopic mixture;

c) fluorinating said partially enriched metallic uranium isotopic mixture of $^{235}U/^{238}U$ to form an isotopic mixture of $UF_6$;

d) feeding said isotopic mixture of $UF_6$ into a $UF_6$ uranium enrichment process selected from the group consisting of a gaseous diffusion process and a gas centrifuge process;

e) processing said $UF_6$ in said $UF_6$ uranium enrichment process until a fully enriched $UF_6$ product, comprising a $^{235}U/^{238}U$ ratio of over 4 wt. % $^{235}U$, has been achieved;

f) recovering said fully enriched $UF_6$ product;

g) recovering a low $^{235}U$ content $UF_6$ from said gaseous diffusion process having a $^{235}U$ content ranging from about 0.6 wt %. to about 0.8 wt. %;

h) contacting said $UF_6$ residue with a reducing agent to reduce said $UF_6$ residue to metallic uranium for recycle into said atomic vapor laser isotope separation process; and i) recovering fluorine values from said low $^{235}U$ content $UF_6$ reduction step and recycling said recovered fluorine values to said fluorination step.

* * * * *